United States Patent [19]

Paelke

[11] Patent Number: 4,518,079
[45] Date of Patent: May 21, 1985

[54] BEND UNIT FOR A BELT CONVEYOR

[76] Inventor: Jürgen Paelke, An der Este 13, D-2117 Tostedt, Fed. Rep. of Germany

[21] Appl. No.: 506,643
[22] PCT Filed: Aug. 23, 1982
[86] PCT No.: PCT/EP82/00178
 § 371 Date: May 20, 1983
 § 102(e) Date: May 20, 1983
[87] PCT Pub. No.: WO83/01057
 PCT Pub. Date: Mar. 31, 1983

[30] Foreign Application Priority Data

Sep. 25, 1981 [DE] Fed. Rep. of Germany ....... 3138192

[51] Int. Cl.³ .............................................. B65G 21/10
[52] U.S. Cl. .................................... 198/864; 198/842
[58] Field of Search ............... 198/864, 842, 509, 511; 414/139, 144

[56] References Cited

U.S. PATENT DOCUMENTS 2,245,113  6/1941  Meyer ................................. 198/511
4,362,237 12/1982  Olsztynski et al. ................. 198/509
4,440,537  4/1983  Blattermann et al. ............... 414/139

FOREIGN PATENT DOCUMENTS 0066846  6/1982  European Pat. Off. ............ 414/144
2932113  2/1981  Fed. Rep. of Germany ...... 414/144

Primary Examiner—Joseph E. Valenza
Assistant Examiner—Kyle E. Shane
Attorney, Agent, or Firm—Bell, Seltzer, Park & Gibson

[57] ABSTRACT

A belt conveyor has a luffing boom (5) and a supporting leg (10) turningly joined with a free end of the boom. The single conveyor belt (15) of the belt conveyor is guided between the boom (5) and the supporting leg (10) by way of a bend unit (24), that has a so-called curved rolling guide (41). This rolling guide (41) is made up of a rigid part-circular guide (42) joined with the boom (5) and a chain-like curved part (43) dependent from the guide (42), the curved part (43) changing into a curved form on upward luffing of the boom (5) because of the wedge-like form of its chain links (43) or because of a curved rail (55) fixed to the top end of the supporting leg (10), whereas on downward luffing of the boom (5) it takes on a straight, freely hanging form so that it is taken up in the supporting leg (10) and for this reason takes up only a little space between the two runs (28 and 29) of the conveyor belt (15).

6 Claims, 7 Drawing Figures

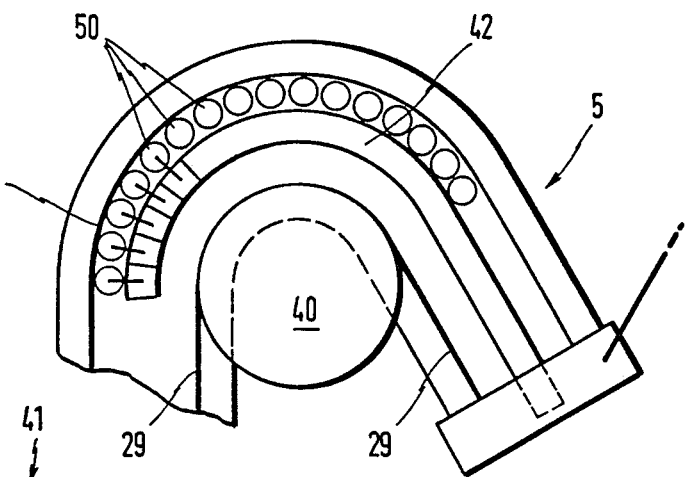
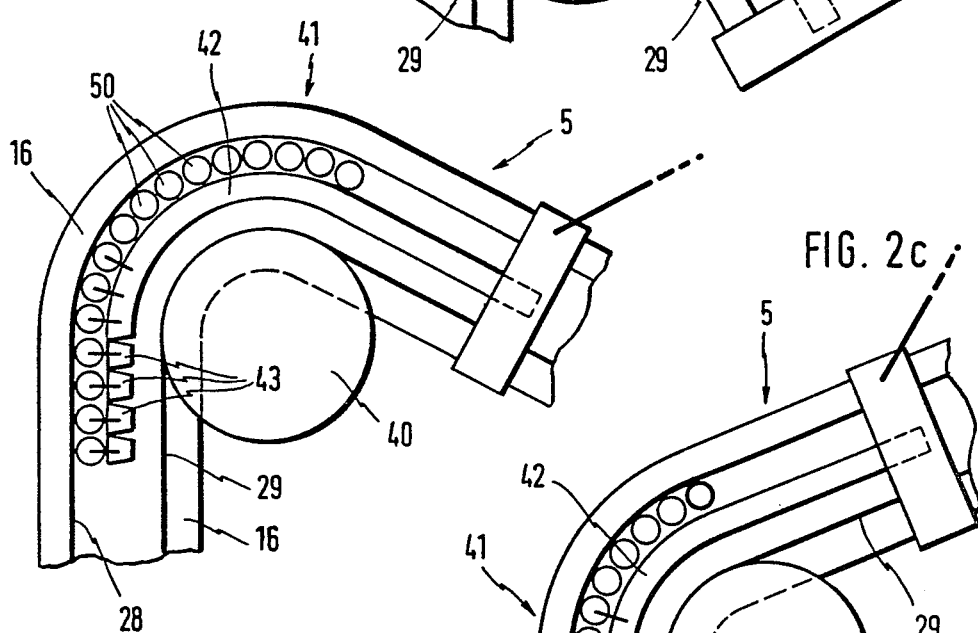
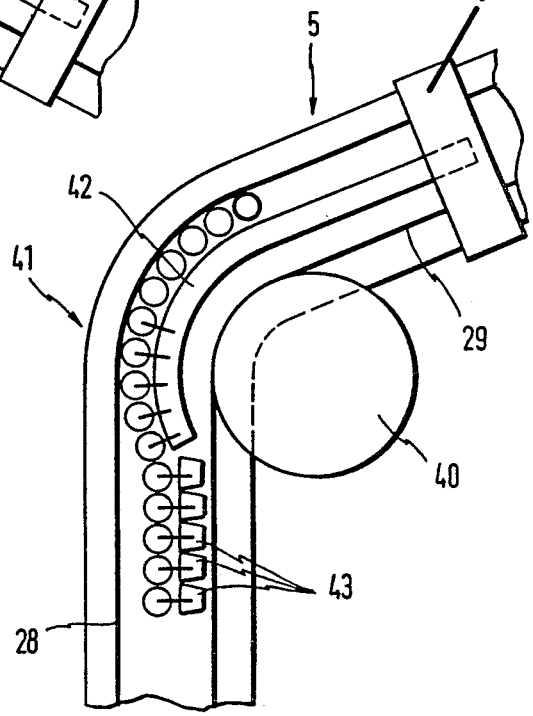
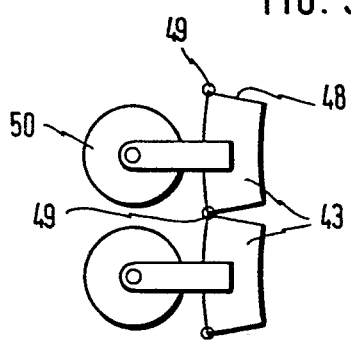

BEND UNIT FOR A BELT CONVEYOR

The present invention is with respect to a bend unit for a bulk belt conveyor in keeping with the preamble of claim 1.

Such bend units are used for example in dock conveyors for unloading and loading bulk material transported by ships, the boom of the conveyor being turningly supported on a portal so that the free end of the boom may be luffed by a rope for motion between lower and upper end positions. At the free end of the boom there is a dependent upright leg, that may be turned about an upright axis, the lower end of the leg being designed for taking up bulk material, for example from the hold of a ship. The conveyor belt is in the form of a single corrugated edge belt running from the lower end of the leg, along the boom and then as far as the portal. At the point of connection between the top end of the leg and the outer free end of the boom there is a bend unit, in which the return run of the conveyor belt is supported by a single bend drum and the carrying run is supported on a number of parallel bend runners in the form of a so-called rolling belt guide.

This bend unit does however have one shortcoming in connection with the fact that the angle between the boom and the upright leg may be for example 30° in the top end position of the boom and for example 110° in the lower end position. That is to say, the carrying run in the top end position of the boom has to be bent through 150° and in the lower end position of the boom through only 70° before it is moved on along the upright leg. If however the bend runners are placed for example along a curved path of 150° using a stiff support, there will be trouble conditions on lowering the boom. In fact, in this case, a great enough distance has to be kept between the return and the carrying runs at the bend unit, because, on lowering the boom, the bend runners placed along a curved path of for example 150° have to be moved on the free end of the boom out towards the return run so that the end of the path or curved rolling guide will be moved against the return run possibly damaging it, at the top end of the upright leg, if the distance between the carrying and return runs is not large enough.

The purpose of the present invention is that of designing a bend unit for a conveyor between two stretches of the conveyor which may be turned in relation to each other so that the bend unit is as small as possible in size.

This purpose is effected by the invention by designing a bend unit as claimed in claim 1, of which further useful developments in keeping with the invention's purpose are claimed in the dependent claims.

With the bend unit of the present invention it becomes possible to keep the distance between the return and carrying runs at the boom, at the upright leg and at the bend unit to a small unchanging value, this being made possible inasfar as the curved rolling guide at the top end of the upright supporting leg is not stiff but is made flexible in such a way that, although the bend runners in the top end position are all placed along a curve, when the boom is lowered the lower runners are moved one by one by gravity into freely hanging positions.

As part of a useful further development of the bend unit of the invention, as claimed in claim 2, this is made possible inasfar as the lower bend runners are joined together by a chain of links with converging side faces forming link-to-link stop faces so that on luffing the boom these chain links, supporting the bend runners, are moved into a curved form with the spaces between the links taken up.

As part of a preferred development of the invention, as claimed in claim 3, this is made possible inasfar as there are only so many links as to let the bending of the carrying run as far as one end of its range of motion in operation, in which the bulk material is conveyed from a large container, as for example the hold of a ship, take place by way of the rigidly supported bend runners. In this case all the bend runners only take up positions along a curved line as part of a circle in a top resting position of the boom, when it is not being used for conveying. Because in this case only very much smaller forces come into play than on conveying operation, the links do not have to be designed for such a great loading force.

In a further useful development of the invention in keeping with claim 4, a curved rail is present which may be moved in relation to the stiff curved part fixed to the boom, the lower runners in the curved rolling guide having trunnions at their ends for running on the said rail, and being chained together, more and more of the trunnions coming to be supported by the rail as the boom is luffed upwards, that is to say on such upward motion of the boom the lower bend runners take up positions one after the other on the curved rail till all the bend runners are placed along a part of a circle in the top, end position of the boom supported on the rail.

As part of a still further useful development of the invention as claimed in claim 5, the change in position of the rail takes place automatically pari passu with changes in the position of the boom.

As part of a preferred development of the invention as claimed in claim 6, the moving rail is fixed to the upright supporting leg. The design is such in this respect that the rail and bend runners fixed on a curved part have a common center so that on lifting and lowering the boom the rail is automatically so changed in position that the curved part, responsible for bending the carrying run, will automatically become smaller or larger in size in a way in keeping with the adjustment of the position of the boom.

Further purposes, details and useful effects of the invention will be seen from the account now to be given of working examples to be seen in the figures.

FIGS. 2a to 2c are diagrammatic views of a first working example of the bend unit of the invention between a boom and an upright leg in different positions of operation.

FIG. 3 is a diagrammatic view of part of the bend unit on a larger scale.

Figure 1:
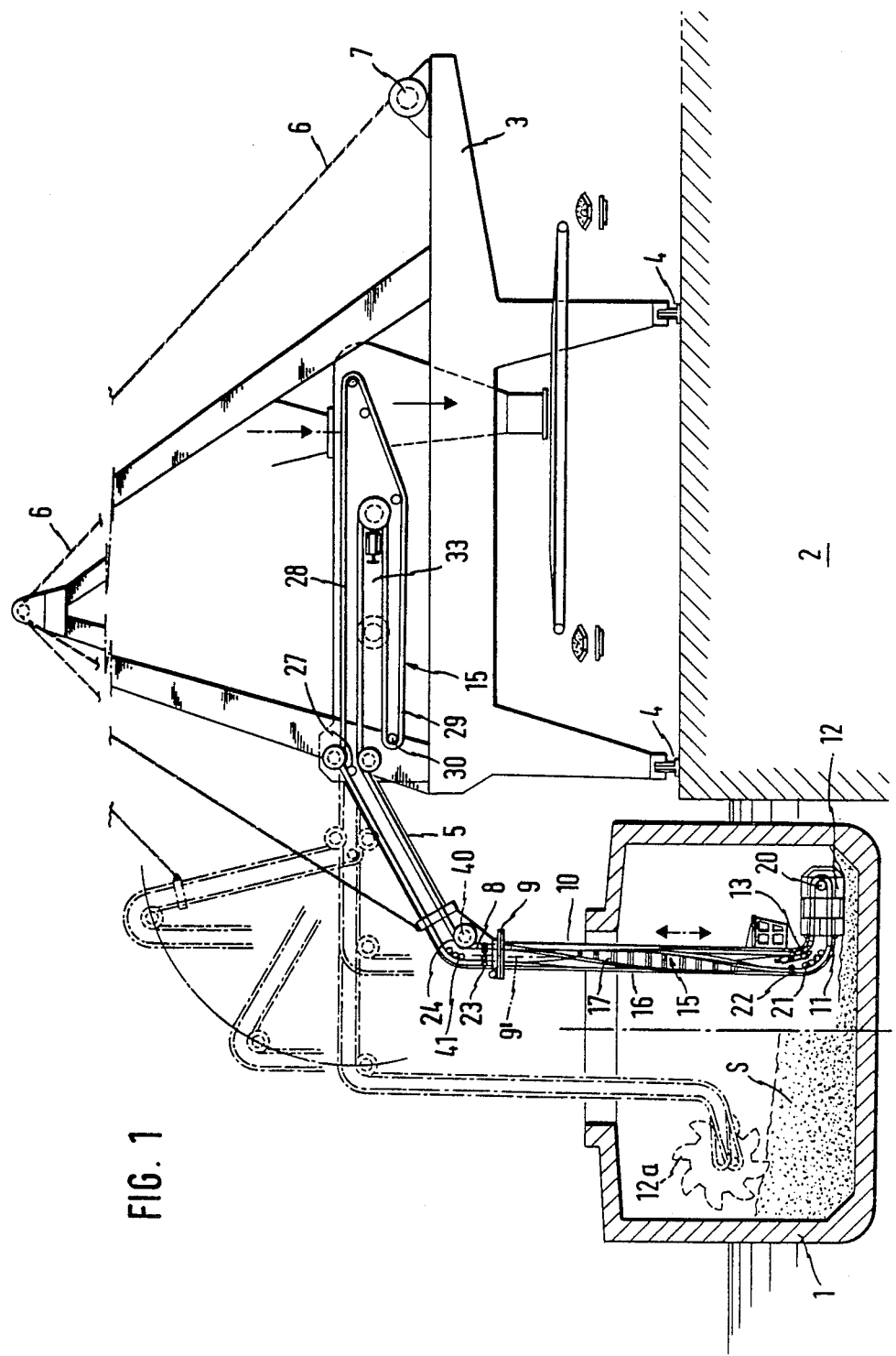
FIG. 1 is a view of a conveyor with a bend unit.

The conveyor to be seen in FIG. 1 for bulk material S, as for example coal, is installed on a dock and may be used for unloading ships 1 berthing at the wharf 2. The conveyor is made up of a portal 3, which may be moved on rails 4 of the wharf alongside the ship 1.

The boom 5 is supported on the portal 3, it stretching out over the ship 1 and being able to be luffed in an upright plane about an axis of turning parallel to the rails 4. In this respect on the portal side the boom 5 is turningly supported on a boom support frame not to be seen in detail in the figure, which may be moved on the portal in a direction at a right angle to the rails 4 horizontally so that the boom may be moved into any desired position of turning horizontally as is marked by chained lines. The luffing or turning of the boom 5 is undertaken by a rope 6 running to a winch 7. At its free end the boom 5 has an endpiece 8 which may be turned in relation to the boom 5 as such about a horizontal cross axis parallel to the rails 4, the endpiece 8 pointing downwards whatever the angle of the boom.

On the endpiece 8 there is a horizontal ball turntable 9 from which an upright support leg 10 is dependent so as to be supported by the endpiece 8 and, for this reason, from the boom 5. The turntable 9 is designed for turning about an upright axis 9' of turning through its middle point so that the support leg 10 may be turned about such axis in relation to the boom 5. In FIG. 1 the leg will be seen marked in chained lines in the so-called normal position and in a position marked in full lines, turned through 180° in relation thereto.

At the lower end the support leg 10 has a short cross boom 11 having a self-feeding wheel 12 or 12a for the bulk material S.

The boom 5, its endpiece 8 and the support leg 10 are all made up of self-supporting tube generally without any openings therein. All the pieces of tube have the same diameter. Furthermore the inner diameter of the turntable 9 is the same as that of the pieces of tube. At the join between the boom 5 and its endpiece 8 and furthermore at the join between the leg 10 and the crossboom 11 there is a slat cover (not to be seen in detail) shutting off the space within the pieces of tube at each join whatever the changes in the angle.

The conveyor has a single-piece conveyor belt 15 running from the self-feeder wheel 12 as far as the portal 3, the belt being in the form of a corrugated edge belt, that is to say a belt having two outwardly running corrugated side edges 16 or walls between which there are cleats 17 regularly spaced along the belt and stretching across the width thereof, the cleats having an angled cross section for forming, together with the corrugated edges, box-like spaces for taking up the bulk material S.

As for details, it will be seen that the conveying belt 15 is run over an end drum 20 at the free end of the crossboom 11, over a bend unit 21 at the join between the crossboom 11 and the support leg 10, a lower guide unit 22 right next to this, a top guide 23 in the endpiece 8, a bend unit 24 next to this at the join between the endpiece and the boom 5 and over a bend unit 27 at the join between the boom and the boom frame and then to a power end drum 30 supported on the portal.

In this respect the conveying belt 15 has its carrying run 28 and its return run 29 guided and supported inside the pieces of the tube of the leg 10, of the endpiece 8 and of the boom 5. The bend unit 24 has a bend drum 40 for the return run 29 and a curved rolling guide 41 about which the carrying run 28 is guided. The rolling guide 41 may be seen more specially from FIGS. 2a to 2c to be made up of a rigid rolling part-circular guide 42 and a tail made up of links 43, joined with the lower end of the part-circular guide 42. The runners of the curved guide 41 have a generally small diameter and they are placed along the bend which is to be produced in the carrying run. In this respect the part-circular guide 42, having part of the runners, is fixed to the boom 5. The links 43 having the rest of the runners supported thereon, are linked together with the topmost link joined up with the lower end of the part-circular guide 42. Links 43 are designed running out to one side of the chain in the form of stops which become narrower along the side faces 48 so that such stops have a trapezoidal cross section. Such links with their stops are joined together by way of hinges 49 at the corners of the broader base part of each link 43, see more specially FIG. 3.

In FIG. 2a the boom 5 with the supporting leg 10 on it will be seen in its upper resting position in which no conveying takes place. On luffing the boom 5 into this resting position the chain links 43 are moved so that their wedge-like stops with the side faces 48 are rested against each other for forming a curved structure of great radius on which the carrying run 28 is bent and supported. In the present working example the carrying run 28, running from the boom 5 to the upright support leg 10, is bent through roughly 150°.

FIG. 2c is a view of the boom 5 with the bend unit 24 in its lower end position, in which the lower chain links 43, that are joined together by way of hinges 49, are hanging straight down under their own weight. Because for this reason the curved guide 41 does not take up very much space, the return run 28 and the carrying run 29 may be guided with a generally small space between them, even at the position of bending.

FIG. 2b is a view of the system at the top end of the range of bending in which conveying still takes place and it will be seen that the rigid part-circular guide 42 is so designed that, in this top position of operation, the carrying run 28 is only bent by way of the runners 50 on the stiff, rigid part-circular guide 42. Further bending by way of the runners 50 which are freely hanging in this top, end-of-range position of operation, and which are supported on links 43, only takes place on further luffing into the top resting position of FIG. 2a. Because of this design it is possible to make certain that, unlike the condition in the resting position, the forces acting on operation of the conveyor are only taken up by way of the rigid part-circular guide 42 and not by way of the runners 50 supported on the links 43. Because of this, the links 43 do not have to be designed ;or taking up the larger forces produced when the system is in the act of conveying material.

Figure 4:
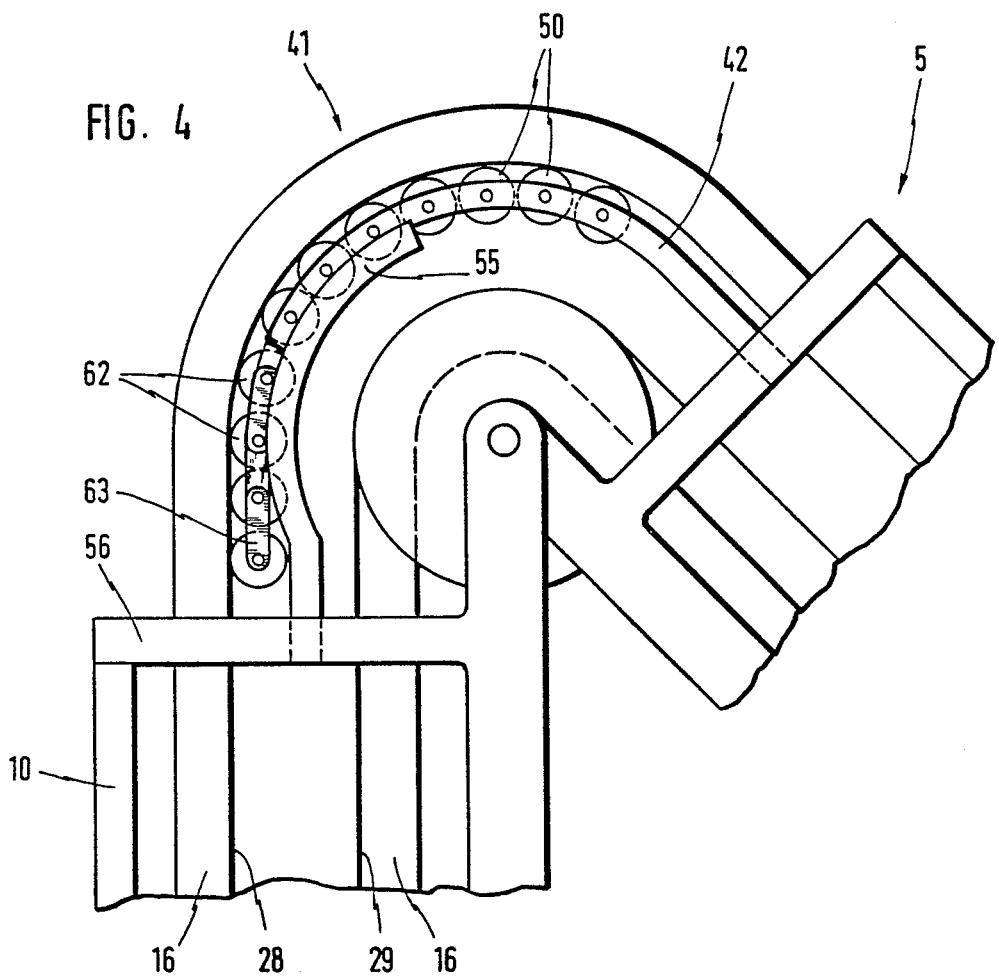
FIG. 4 is a diagrammatic side view of a second working example of the bend unit of the invention between the boom and the upright support leg.
Figure 5:
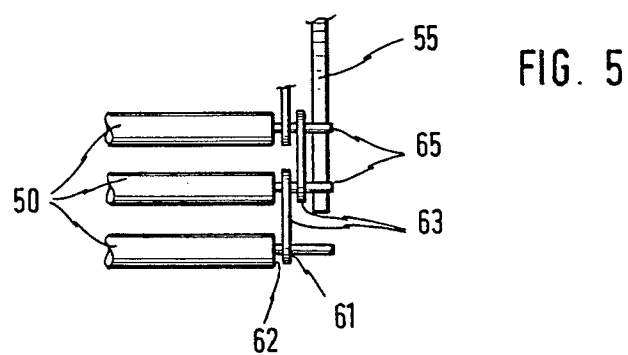
FIG. 5 is a view of part of the bend unit of FIG. 4

In FIGS. 4 and 5 a further working example of the invention will be seen. At the lower end of the rigid part-circular guide 42, fixed to the boom 5, of the rolling guide 41 there is, in this case, a moving rail 55 that is fixed to the top end 56 of the upright supporting leg 10. In this working example the lower runners 50 are joined together by chain links 63 and to this end the end faces 62 of the runners 50 have trunnions 65 running through eyes 61 in the chain links 63.

In the working position of FIG. 4 it will be seen that the lower runners 50, supported by the links 63, are partly dependent under the effect of their own weight and in a hanging position, for which reason the distance between the return run 29 and the carrying run 28 may be kept small enough. On luffing the boom into the top resting position, the lower runners 50, that are joined by way of the links 63 with the fixed part-circular guide 42, are moved upwards in relation to the upright support leg 10, their end trunnions 65 then running on to the outer curved or peripheral edge 68 of the curved rail 55, that is fixed to the upright leg 10. Because of this design the curved, supported rolling guide in the bend unit 24 is made larger or smaller in keeping with any desired working position of the boom.

The working example of the invention in keeping with FIGS. 4 and 5 presently seems to be the best way of putting the invention into effect.

I claim:

1. A bend unit for a bulk belt conveyor having a boom able to be luffed about a turning axis between upper and lower end positions of a boom luffing range, which at an outer free end thereof has an upright hanging leg joined with it, the conveyor further having in the boom and the leg a conveyor belt with carrying and return runs, of which the carrying run between the top end of the supporting leg and the free end of the boom is supported at the said bend unit by runners in the form of a curved rolling guide at the said free boom end, characterized in that the curved rolling guide made up of runners has a stiff part-circular guide and lower rocking jointed links at an upper end of said upright leg, the said jointed links keeping the runners in position and on luffing said boom into its top end position all the said links come to be supported one by one so as to take up a belt-supporting curved form as part of circle using supporting means.

2. A bend unit as claimed in claim 1 characterized in that the chain links have converging sides and broad base parts, formed thereby, at which the links are linked together.

3. A bend unit as claimed in claim 1 or claim 2 characterized by the said chain links hanging down freely under their own weight in positions of the boom between the lower and upper ends of its range of motion in operation.

4. A bend unit as claimed in claim 1 characterized by the runners supported by the chain links having end trunnions at their ends and by a curved rail as the supporting means, which on upward luffing of the boom from its lower into its upper position may be moved outwards so that the trunnions come up against the top side of the curved rail.

5. A bend unit as claimed in claim 1 or claim 4 characterized in that said curved rail is automatically moved in keeping with motion of said boom.

6. A bend unit as claimed in claim 5 characterized in that said rigid curved rail and the said part-circular guide are curved about a common center point, said rail being fixed to said leg.

* * * * *